F. ORTH.
CEMENT OR MORTAR MIXER AND ELEVATOR.
APPLICATION FILED MAR. 2, 1908.

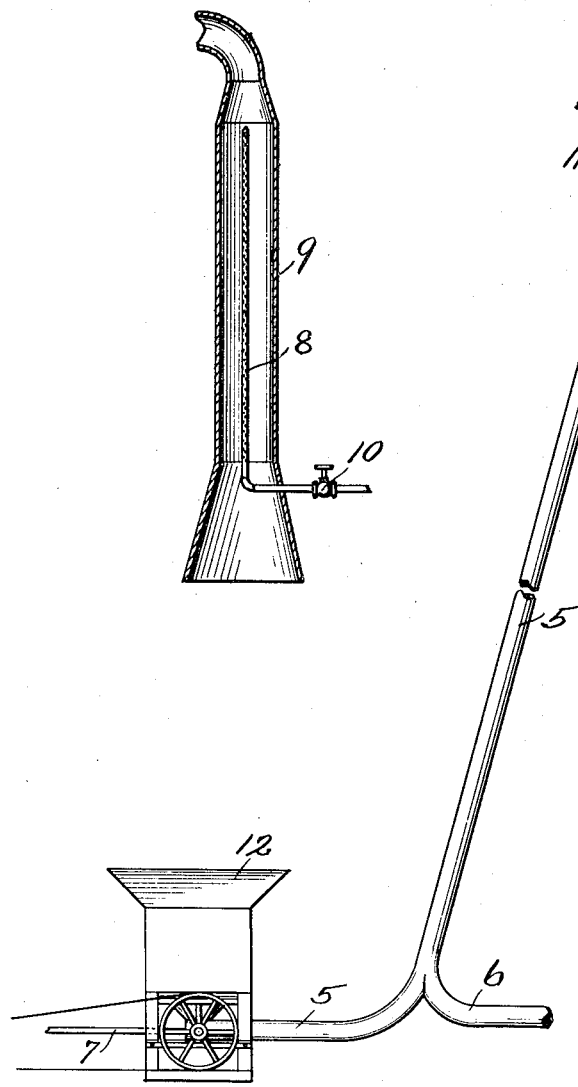
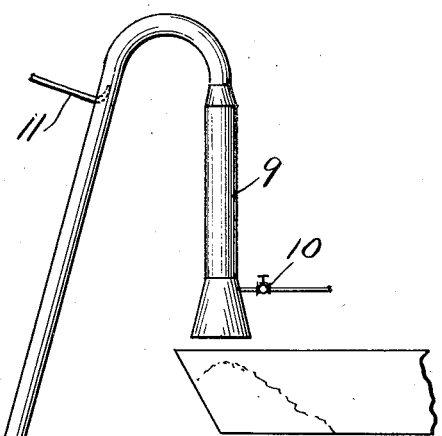

1,161,789.

Patented Nov. 23, 1915.
2 SHEETS—SHEET 2.

Witnesses:
R. R. Symons
C. L. Cross

Inventor:
Frank Orth
By R. J. Jacker
Atty.

UNITED STATES PATENT OFFICE.

FRANK ORTH, OF INDIANA HARBOR, INDIANA.

CEMENT OR MORTAR MIXER AND ELEVATOR.

1,161,789.  Specification of Letters Patent.  Patented Nov. 23, 1915.

Application filed March 2, 1908. Serial No. 418,888.

*To all whom it may concern:*

Be it known that I, FRANK ORTH, a citizen of the United States, residing at Indiana Harbor, in the county of Lake and State of Indiana, have invented a new and useful Cement or Mortar Mixer and Elevator, of which the following is a specification.

My invention relates to a mixer and elevator in which the material to be treated is mixed and elevated by being forced through a tube or pipe by means of a current generated by air or steam pressure and the objects of my invention are, first, to thoroughly mix the material placed into the device; second, to elevate the material during the mixing process; third, to apply the necessary moisture to the material after the same has been mixed; fourth, to make a simple, cheap and durable device and other objects to become apparent from the description to follow.

Such material as cement and mortar at present are mixed in a machine or mixing vat of some suitable kind, which stands or rests on the ground or floor and is also usually provided with the necessary amount of moisture or water, while being thus mixed; and after being mixed is carted or hauled away to the place of application. By the use of my invention all expensive machinery for mixing the material is dispensed with and the hauling or transferring of the material is done by forcing the two or more materials, to be mixed, through a tube or pipe and having the delivery end of said tube or pipe at the place of application of the finished mixed material.

My invention more particularly is concerned with the method of mixing and elevating material of the class referred to and consists of feeding two or more materials into a pipe each in its desired proportion; a constant current of air or steam is created in the pipe by any suitable means, of sufficient force to carry the material to its destination, and at or near the discharge end of the pipe the required amount of moisture or water is applied.

Figure 3:
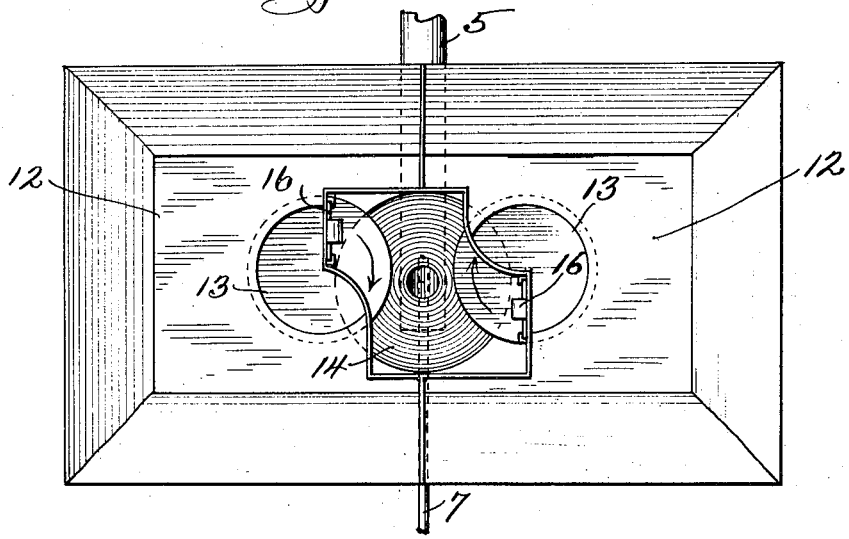
Figure 4:
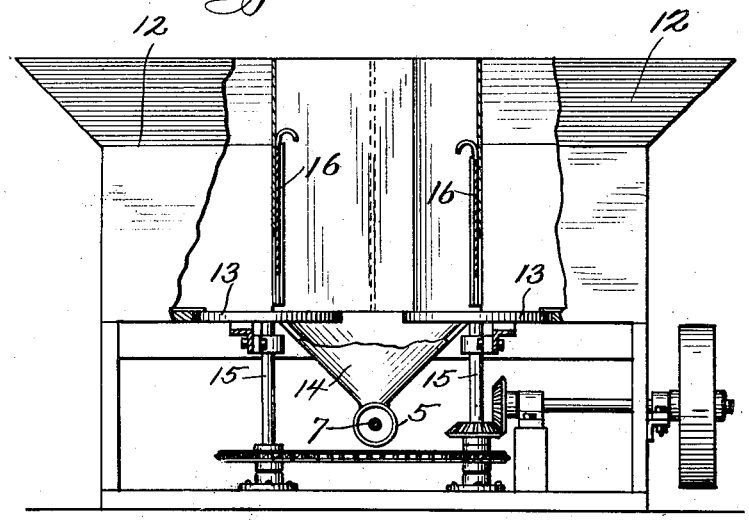

In the drawings forming a part of this specification I have illustrated one form of apparatus which may be employed to carry out my invention, in which, Figure 1, is a general view in elevation of the complete apparatus. Fig. 2, is a detail sectional view of that part of the apparatus where the moisture or water is applied; Fig. 3, is a plan view of a material feeding device shown in Fig. 1; and Fig. 4, is an elevation partly in section of the same.

Similar reference characters refer to similar parts throughout the several views.

The tube or pipe 5 is made of any suitable material, preferably of metal and extends from the place where the material to be used is stored, which is usually on the ground, to the place where the mixed material is to be used or applied permanently, which is usually on some upper floor of a building. The lower or intake end of the pipe 5 may have one or more branches 6 if desired to lead from the different materials to be mixed. A current of sufficient force is generated in the pipe 5 by any means as for example by applying a jet of air or steam into the intake end of pipe 5 through the smaller pipe 7. The materials to be mixed and elevated are fed in the desired proportion into the intake end of pipe 5 and also pipe 6 if desired; the current within the pipe carries the materials to the delivery end of the pipe and on their course through said pipe they become thoroughly mixed. At or near the delivery end of the pipe 5 the necessary moisture or water is applied to the mixed materials by any desired means as for example by having a small perforated pipe 8 extend centrally into the enlarged end 9 of pipe 5 and having a constant flow of water admitted into said pipe 8, the flow may be regulated by a valve 10. The water will be expelled from pipe 8 through the perforations therein and will thoroughly mix with the mixed materials passing through pipe 5.

In mixing some materials which have as an ingredient unslaked lime, or if very fine dust like material is used, it may be necessary to apply hot water or steam to expedite the slaking of the lime or moisten the dust like material while confined in the pipe, and a pipe for the introduction of such hot water or steam is shown at 11. The materials to be mixed which are fed into the intake end of pipe 5 are preferably fed gradually and in certain proportions continually. I have shown one means for doing this comprising the adjoining hoppers 12, having their floors provided with a rotating disk 13 having a portion of its surface within the hoppers and a portion outside the hoppers above a funnel or hopper 14 which discharges into the intake end of pipe 5. The disks 13 are mounted on shafts 15 which are geared to rotate at the same time but at different speeds if desired. A part of the hopper walls above the disks 13 are provided with slides 16 which can be raised and lowered to regulate the amount of material fed out of the hopper by the disk.

In operation the material in the hoppers 12 is gradually carried out of said hoppers under the slides 16 by the rotation of the disks 13 and is scraped off of the disks 13 by a portion of the wall of the hoppers and falls into hopper 14 from whence it falls into the intake end of the pipe 5 and thence is carried by the current as described to its destination. If desired the materials to be mixed may be led into the pipe 5 by a plurality of branch pipes 6.

Having thus fully described my invention what I claim as new and desire to secure by Letters Patent of the United States is:

1. In a device of the class described, the combination of a conveying and mixing pipe, means for introducing dry materials into the front end of said pipe in desired proportions, means for creating a current of air throughout the length of the pipe for the purpose of carrying the dry materials along the pipe and mixing them together, means for heating said materials after they are mixed together and before they leave the pipe, and means for introducing water into the pipe and into contact with the materials after they are heated, substantially as described.

2. In an apparatus of the class described, the combination of a transporting and mixing pipe, means for introducing two or more raw materials separately into the pipe, means for transporting materials through the pipe by the air blast, and means for heating the materials after they are transported.

3. In an apparatus of the class described, the combination of a transporting and mixing pipe, means for separately introducing raw materials into the pipe, means for creating an air blast through the pipe to transport the materials through the pipe and to mix them together, means for heating the materials while they are in the pipe, and means for wetting the materials after they have been heated.

In testimony whereof I have signed my name to this specification in presence of two subscribing witnesses this 25th day of February 1908, at Chicago, Illinois.

FRANK ORTH.

Witnesses:
R. J. JACKER,
MILTON LENOIR.